US012626718B2

(12) United States Patent
Liu et al.

(10) Patent No.: US 12,626,718 B2
(45) Date of Patent: **\*May 12, 2026**

(54) COVER SONG IDENTIFICATION METHOD AND SYSTEM

(71) Applicant: Gracenote, Inc., New York, NY (US)

(72) Inventors: Xiaochen Liu, Jersey City, NJ (US); Joseph P. Renner, Lille (FR); Joshua E. Morris, Nashville, TN (US); Todd J. Hodges, Oakland, CA (US); Robert Coover, Orinda, CA (US); Zafar Rafii, Berkeley, CA (US)

(73) Assignee: Gracenote, Inc., New York, NY (US)

( \* ) Notice: Subject to any disclaimer, the term of this patent is extended or adjusted under 35 U.S.C. 154(b) by 202 days.

This patent is subject to a terminal disclaimer.

(21) Appl. No.: 18/768,497

(22) Filed: Jul. 10, 2024

(65) Prior Publication Data

US 2024/0363138 A1      Oct. 31, 2024

Related U.S. Application Data

(63) Continuation of application No. 17/335,657, filed on Jun. 1, 2021, now Pat. No. 12,094,490.

(Continued)

(51) Int. Cl.
*G10L 25/90* (2013.01)
*G06F 16/632* (2019.01)
(Continued)

(52) U.S. Cl.
CPC ............ *G10L 25/90* (2013.01); *G06F 16/634* (2019.01); *G06F 16/685* (2019.01); *G06N 3/08* (2013.01); *G06N 20/00* (2019.01); *G10L 19/022* (2013.01)

(58) Field of Classification Search
CPC ....... G10L 25/90; G10L 19/022; G06N 20/00; G06N 3/08; G06F 16/634; G06F 16/685
See application file for complete search history.

(56) References Cited

U.S. PATENT DOCUMENTS

| 2008/0300702 A1* | 12/2008 | Gomez | ................... G10L 25/48 |
| | | | 700/94 |
| 2020/0320398 A1 | 10/2020 | Lyske | |

(Continued)

FOREIGN PATENT DOCUMENTS

CN            110598208 A      12/2019

OTHER PUBLICATIONS

Written Opinion of the International Searching Authority for International Application No. PCT/US2021/063318 mailed Mar. 28, 2022.

(Continued)

*Primary Examiner* — Bhavesh M Mehta
*Assistant Examiner* — Edward Tracy, Jr.
(74) *Attorney, Agent, or Firm* — McDonnell Boehnen Hulbert & Berghoff LLP

(57) ABSTRACT

A cover song identification method implemented by a computing system comprises receiving, by a computing system and from a user device, harmonic pitch class profile (HPCP) information that specifies one or more HPCP features associated with target audio content. A major chord profile feature and a minor chord profile feature associated with the target audio content are derived from the HPCP features. Machine learning logic of the computing system determines, based on the major chord profile feature and the minor chord profile feature, a relatedness between the target audio content and each of a plurality of audio content items specified in records of a database. Each audio content item is associated with cover song information. Cover song information (Continued)

associated with an audio content item having a highest relatedness to the target audio content is communicated to the user device.

20 Claims, 8 Drawing Sheets

Related U.S. Application Data

(60) Provisional application No. 63/133,042, filed on Dec. 31, 2020.

(51) Int. Cl.

| | | |
|---|---|---|
| *G06F 16/683* | (2019.01) | |
| *G06N 3/08* | (2023.01) | |
| *G06N 20/00* | (2019.01) | |
| *G10L 19/022* | (2013.01) | |

(56) References Cited

U.S. PATENT DOCUMENTS

| | | |
|---|---|---|
| 2021/0012200 A1 | 1/2021 | Lyske |
| 2022/0108175 A1 | 4/2022 | Lyske |

OTHER PUBLICATIONS

International Search Report for International Application No. PCT/US2021/063318 mailed Mar. 28, 2022.

Gino Brunner et al. 'JamBot: Music Theory Aware Chord Based Generation of Polyphonic Music with LSTMs', arXiv:1711.07682, Nov. 2017, pp. 1-8.

Joan Serra et al. 'Chroma Binary Similarity and Local Alignment Applied to Cover Song Identification', In: IEEE Transactions on Audio, Speech, and Language Processing, Aug. 2008, vol. 16, pp. 1138-1151.

Joan Serra Julia, 'Identification of Versions of the Same Musical Composition by Processing Audio Descriptions', 2011, pp. 1-151.

* cited by examiner

CONTENT MATCHING RECORDS
500

| Content ID | Content Information | Embeddings |
|---|---|---|
| CID1 | Song X, Artist Y, Album Z | E1 |
| CID2 | Song A, Artist B, Album C | E2 |
| ... | ... | ... |
| $CID_M$ | Song W, Artist U, Album V | E_N |

*FIG. 5*

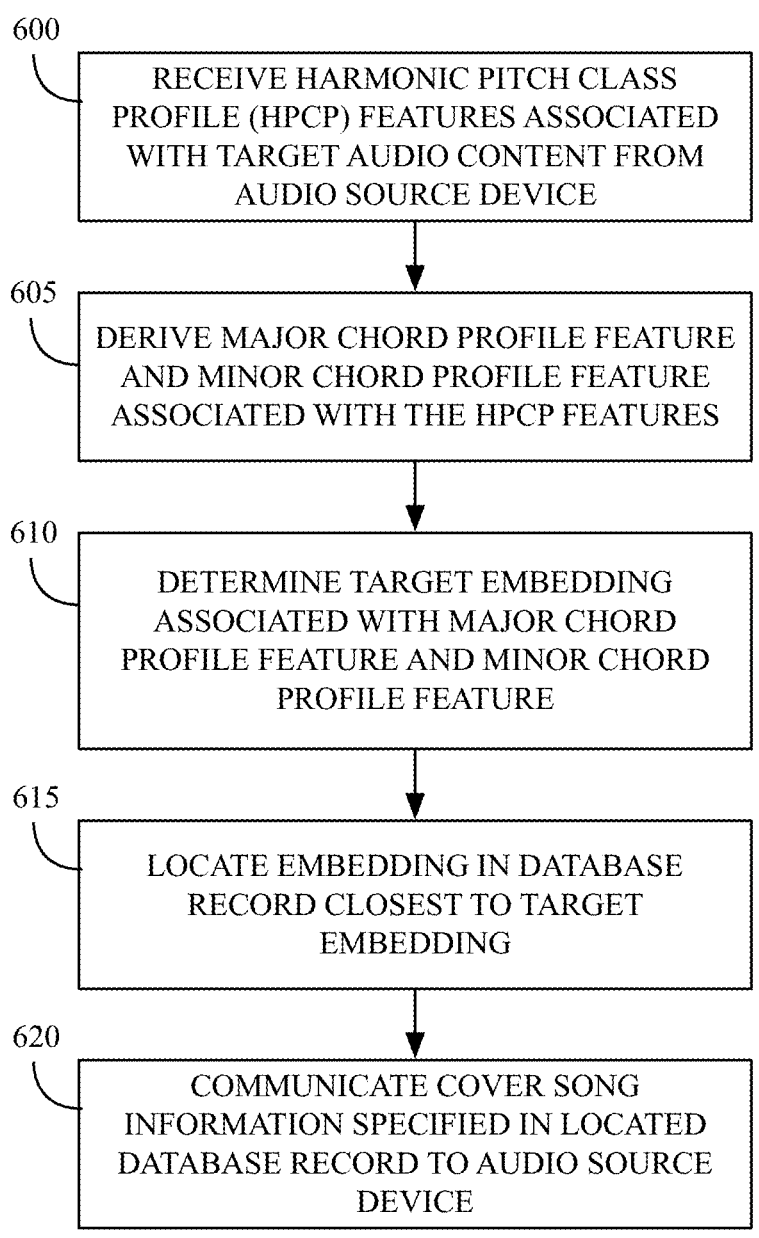

600

RECEIVE HARMONIC PITCH CLASS PROFILE (HPCP) FEATURES ASSOCIATED WITH TARGET AUDIO CONTENT FROM AUDIO SOURCE DEVICE

605

DERIVE MAJOR CHORD PROFILE FEATURE AND MINOR CHORD PROFILE FEATURE ASSOCIATED WITH THE HPCP FEATURES

610

DETERMINE TARGET EMBEDDING ASSOCIATED WITH MAJOR CHORD PROFILE FEATURE AND MINOR CHORD PROFILE FEATURE

615

LOCATE EMBEDDING IN DATABASE RECORD CLOSEST TO TARGET EMBEDDING

620

COMMUNICATE COVER SONG INFORMATION SPECIFIED IN LOCATED DATABASE RECORD TO AUDIO SOURCE DEVICE

*FIG. 6*

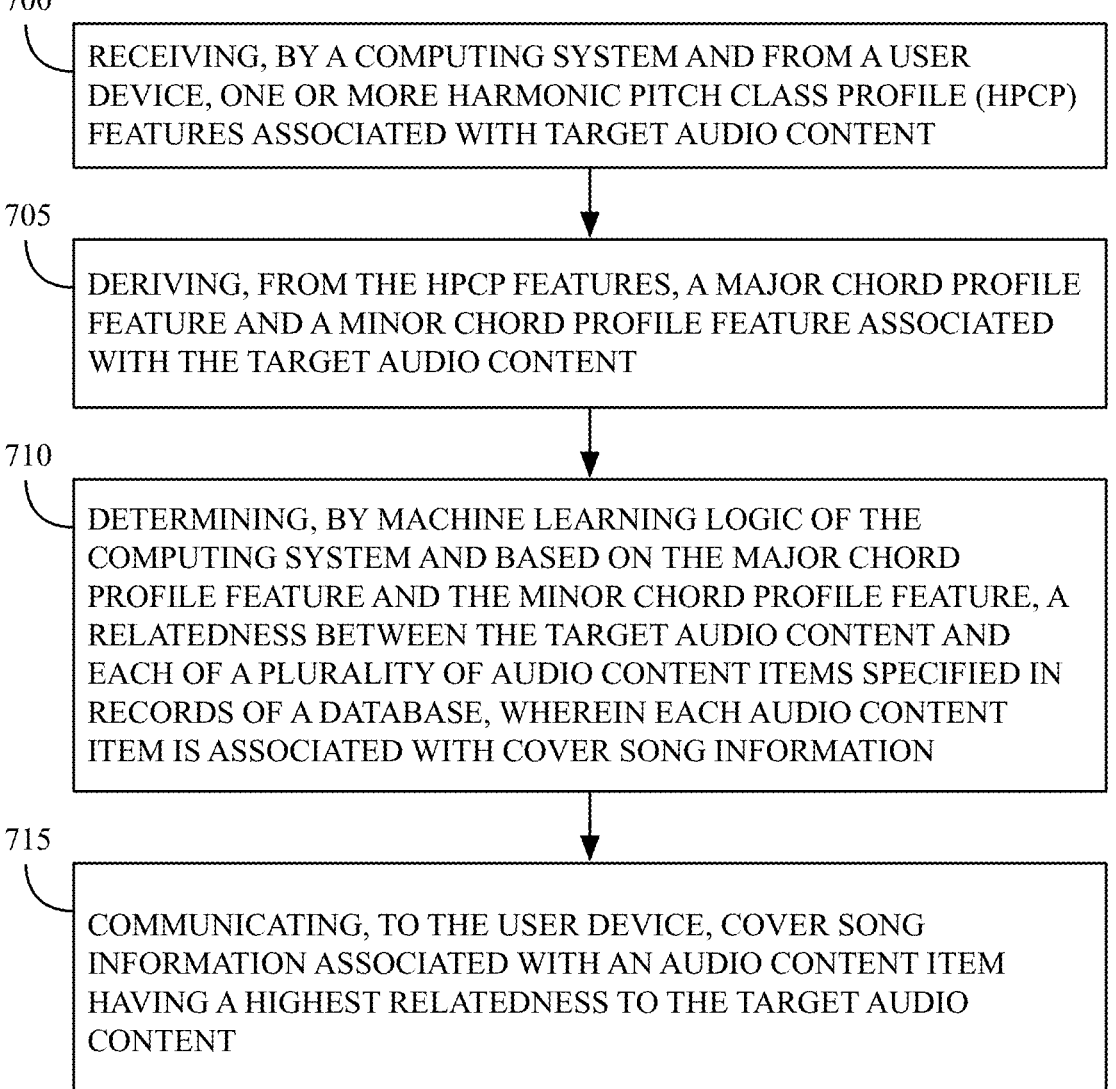

700

RECEIVING, BY A COMPUTING SYSTEM AND FROM A USER DEVICE, ONE OR MORE HARMONIC PITCH CLASS PROFILE (HPCP) FEATURES ASSOCIATED WITH TARGET AUDIO CONTENT

705

DERIVING, FROM THE HPCP FEATURES, A MAJOR CHORD PROFILE FEATURE AND A MINOR CHORD PROFILE FEATURE ASSOCIATED WITH THE TARGET AUDIO CONTENT

710

DETERMINING, BY MACHINE LEARNING LOGIC OF THE COMPUTING SYSTEM AND BASED ON THE MAJOR CHORD PROFILE FEATURE AND THE MINOR CHORD PROFILE FEATURE, A RELATEDNESS BETWEEN THE TARGET AUDIO CONTENT AND EACH OF A PLURALITY OF AUDIO CONTENT ITEMS SPECIFIED IN RECORDS OF A DATABASE, WHEREIN EACH AUDIO CONTENT ITEM IS ASSOCIATED WITH COVER SONG INFORMATION

715

COMMUNICATING, TO THE USER DEVICE, COVER SONG INFORMATION ASSOCIATED WITH AN AUDIO CONTENT ITEM HAVING A HIGHEST RELATEDNESS TO THE TARGET AUDIO CONTENT

*FIG. 7*

COVER SONG IDENTIFICATION METHOD AND SYSTEM

RELATED APPLICATIONS

This application claims the benefit of priority under 35 U.S.C. § 119 (e) of U.S. Provisional Application No. 63/133,042, filed Dec. 31, 2020, the content of which is incorporated herein by reference in its entirety.

BACKGROUND

Field

This application generally relates to audio content recognition. In particular, this application describes a cover song identification method and system for performing cover song identification.

Description of Related Art

Cover song identification (CSI) is a popular task in music information retrieval (MIR) that aims to identify if two music recordings are different renditions or covers of the same composition. CSI is utilized in applications such as the classification of musical works, music rights management, and general music similarity search. Covers typically vary in terms of key, tempo, singer, or instrumentation, which can make identification of a particular cover song challenging.

SUMMARY

In a first aspect, a cover song identification method implemented by a computing system comprises receiving, by a computing system and from a user device, harmonic pitch class profile (HPCP) information that specifies one or more HPCP features associated with target audio content. A major chord profile feature and a minor chord profile feature associated with the target audio content are derived from the HPCP features. Machine learning logic of the computing system determines, based on the major chord profile feature and the minor chord profile feature, a relatedness between the target audio content and each of a plurality of audio content items specified in records of a database. Each audio content item is associated with cover song information. Cover song information associated with an audio content item having a highest relatedness to the target audio content is communicated to the user device.

In a second aspect, a computing system that facilitates cover song identification includes a memory and a processor. The memory stores instruction code. The processor is in communication with the memory. The instruction code is executable by the processor to cause the computing system to perform operations that include receiving, by a computing system and from a user device, harmonic pitch class profile (HPCP) information that specifies one or more HPCP features associated with target audio content. A major chord profile feature and a minor chord profile feature associated with the target audio content are derived from the HPCP features. Machine learning logic of the computing system determines, based on the major chord profile feature and the minor chord profile feature, a relatedness between the target audio content and each of a plurality of audio content items specified in records of a database. Each audio content item is associated with cover song information. Cover song information associated with an audio content item having a highest relatedness to the target audio content is communicated to the user device.

In a third aspect, a non-transitory computer-readable medium has stored thereon instruction code that facilitates cover song identification. When the instruction code is executed by a processor, the processor performs operations that include receiving, by a computing system and from a user device, harmonic pitch class profile (HPCP) information that specifies one or more HPCP features associated with target audio content. A major chord profile feature and a minor chord profile feature associated with the target audio content are derived from the HPCP features. Machine learning logic of the computing system determines, based on the major chord profile feature and the minor chord profile feature, a relatedness between the target audio content and each of a plurality of audio content items specified in records of a database. Each audio content item is associated with cover song information. Cover song information associated with an audio content item having a highest relatedness to the target audio content is communicated to the user device.

BRIEF DESCRIPTION OF THE DRAWINGS

The accompanying drawings are included to provide a further understanding of the claims, are incorporated in, and constitute a part of this specification. The detailed description and illustrated examples described serve to explain the principles defined by the claims.

FIG. 5 illustrates content matching records stored in a database of the CRS, in accordance with an example.

FIG. 6 illustrates operations performed by the audio source device and/or the CRS, in accordance with an example.

FIG. 7 illustrates a method performed by one or more systems or devices described herein, in accordance with an example.

DETAILED DESCRIPTION

Various examples of systems, devices, and/or methods are described herein. Words such as "example" and "exemplary" that may be used herein are understood to mean "serving as an example, instance, or illustration." Any embodiment, implementation, and/or feature described herein as being an "example" or "exemplary" is not necessarily to be construed as preferred or advantageous over any other embodiment, implementation, and/or feature unless stated as such. Thus, other embodiments, implementations, and/or features may be utilized, and other changes may be made without departing from the scope of the subject matter presented herein.

Accordingly, the examples described herein are not meant to be limiting. It will be readily understood that the aspects of the present disclosure, as generally described herein, and illustrated in the figures, can be arranged, substituted, combined, separated, and designed in a wide variety of different configurations.

Further, unless the context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Moreover, terms such as "substantially" or "about" that may be used herein are meant that the recited characteristic, parameter, or value need not be achieved exactly, but that deviations or variations, including, for example, tolerances, measurement error, measurement accuracy limitations and other factors known to those skilled in the art, may occur in amounts that do not preclude the effect the characteristic was intended to provide.

Figure 1:
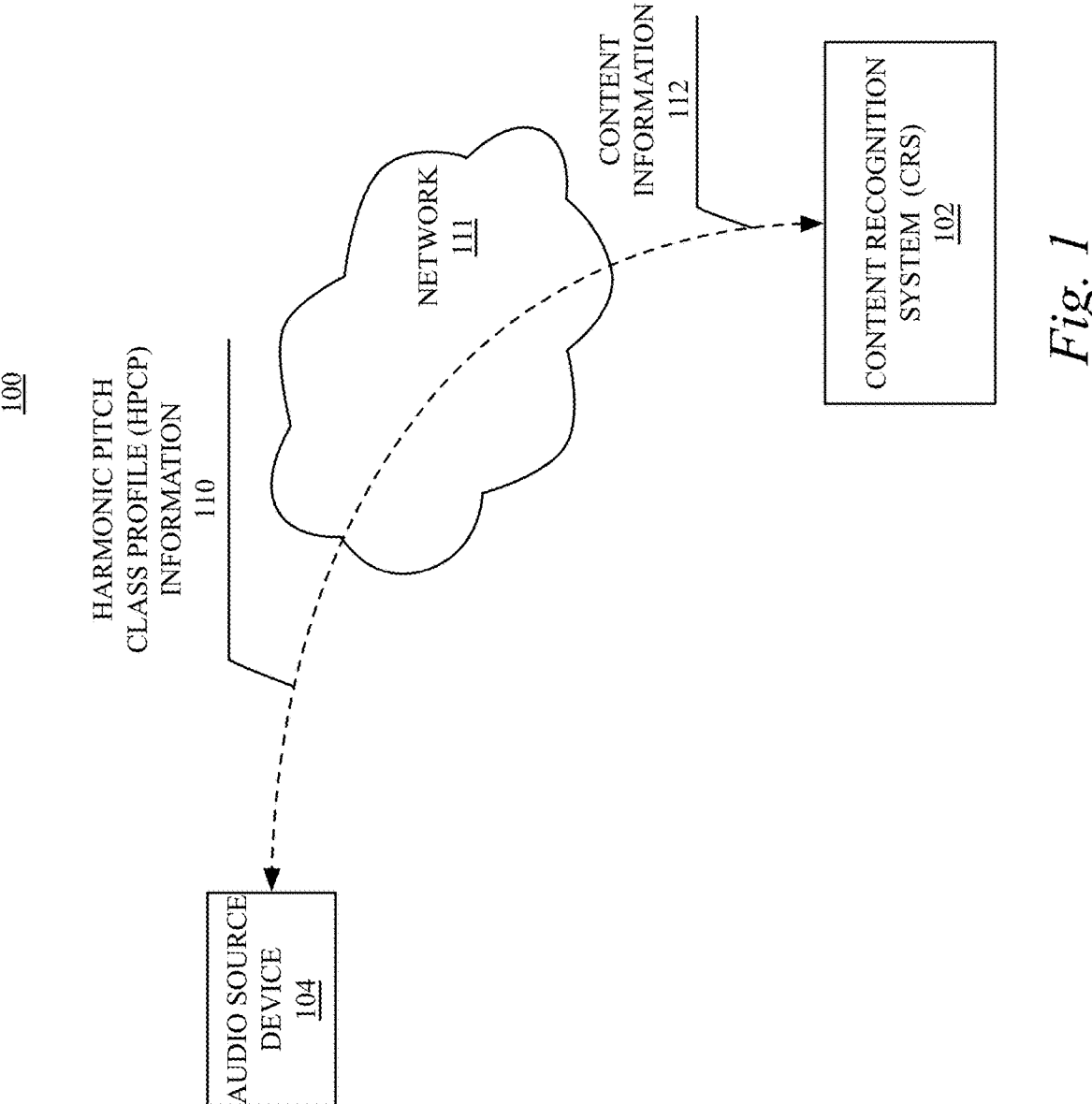
FIG. 1 illustrates an environment that includes various systems/devices that facilitate performing audio content recognition, in accordance with an example.

FIG. 1 illustrates an example of an environment 100 that includes various systems/devices that facilitate performing cover song identification. Example systems/devices of the environment 100 include an audio source device 104 and a content recognition system (CRS) 102. As described in further detail below, the audio source device 104 is configured to communicate harmonic pitch class profile (HPCP) information 110 to the CRS 102. In response to receiving this information, the CRS 102 is configured to determine content information 112 associated with the HPCP information (e.g., the cover name for the song) and, in some examples, communicate the content information 112 to the audio source device 104. In an example, the audio source device 104 and CRS 102 communicate information to one another via a communication network 111, such as a cellular communication network, a WiFi network, etc.

Figure 2:
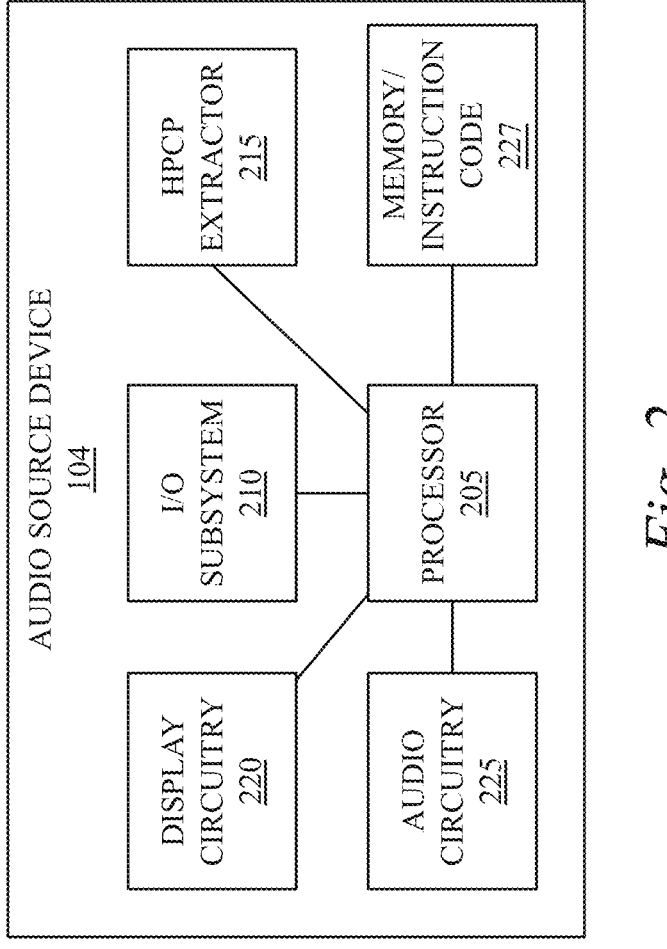
FIG. 2 illustrates an audio source device, in accordance with an example.

FIG. 2 illustrates an example of an audio source device 104. The audio source device 104 corresponds to an audio and/or video presentation device. An example of the audio source device 104 corresponds to a wearable device, such as a mobile device (e.g., mobile phone, watch, etc.). Another example of the audio source device 104 corresponds to or is in communication with a home television, stereo, etc. An example of the audio source device 104 includes a memory 227 and a processor 205. Another example of the audio source device 104 also includes an input/output (I/O) subsystem 210, display circuitry 220, audio circuitry 225, and an HPCP extractor 215.

An example of the processor 205 is in communication with the memory 227. The processor 205 is configured to execute instruction code stored in the memory 227. The instruction code facilitates performing, by the audio source device 104, various operations that are described below. In this regard, the instruction code can cause the processor 205 to control and coordinate various activities performed by the different subsystems of the audio source device 104. An example of the processor 205 corresponds to a stand-alone computer system such as an Intel®, AMD®, or PowerPC® based computer system or a different computer system and can include application-specific computer systems. An example of the computer system includes an operating system, such as IOS®, Android®, Windows®, Linux, Unix®, or a different operating system.

An example of the I/O subsystem 210 includes one or more input/output interfaces configured to facilitate communications with other systems of the audio source device 104 and/or entities outside of the audio source device 104. For instance, an example of the I/O subsystem 210 includes wireless communication circuitry configured to facilitate communicating information to and from the CRS 102. An example of the wireless communication circuitry includes cellular telephone communication circuitry configured to communicate information over a cellular telephone network such as a 3G, 4G, and/or 5G network. Other examples of the wireless communication circuitry facilitate communication of information via an 802.11 based network, Bluetooth®, Zigbee®, near field communication technology, or a different wireless network.

An example of the display circuitry 220 includes a liquid crystal display (LCD), light-emitting diode display (LED) display, etc. An example of the display circuitry 220 includes a transparent capacitive touch layer that facilitates receiving user commands. An example of the display circuitry 220 is configured to depict a graphical user interface (GUI). An example of the GUI is configured to generate an overlay over some or all of the content being rendered by the display. An example of the overlay facilitates displaying static text/images and/or video content.

An example of the audio circuitry 225 includes one or more digital-to-analog converters (DAC), analog-to-digital converters (ADC), amplifiers, speakers, microphones, etc. An example of the audio circuitry 225 is configured to receive multiple streams of digital audio content (e.g., left channel, right channel) and to route these streams to corresponding DACs, amplifiers, and speakers. An example of the audio circuitry 225 is configured to mix audio content from two or more streams together and to route the combined streams to a single DAC, amplifier, and speaker. An example of the audio circuitry 225 is configured to receive multiple analog audio signals via the microphone or another analog audio input and to route these digitized audio samples to other subsystems in communication with the audio circuitry 225.

An example of the HPCP extractor 215 is configured to input audio samples associated with audio content. An example of the HPCP extractor 215 performs spectral analysis on these samples to obtain the frequency components associated with the audio content. In an example, the HPCP extractor 215 utilizes a Fourier transform to convert the signal into a spectrogram. The HPCP extractor 215 filters/selects frequencies between 100 and 5000 Hz in the spectrogram and performs peak detection at these frequencies. In some examples, only the local maximum values of the spectrum are considered. An example of the HPCP extractor 215 performs a reference frequency computation that involves estimating the deviation with respect to 440 Hz. Pitch class mapping is performed with respect to the estimated reference frequency. This involves determining the pitch class value from frequency values. In an example, a weighting technique with a cosine function is used. This technique considers the presence of harmonic frequencies (harmonic summation procedure), taking into account a total of 8 harmonics for each frequency. In an example, the size of the pitch class distribution vectors is set to be equal to 36 to facilitate mapping the value on a one-third of a semitone. In an example, the feature frame is a normalized frame dividing through the maximum value to eliminate dependency on global loudness.

Figure 3:
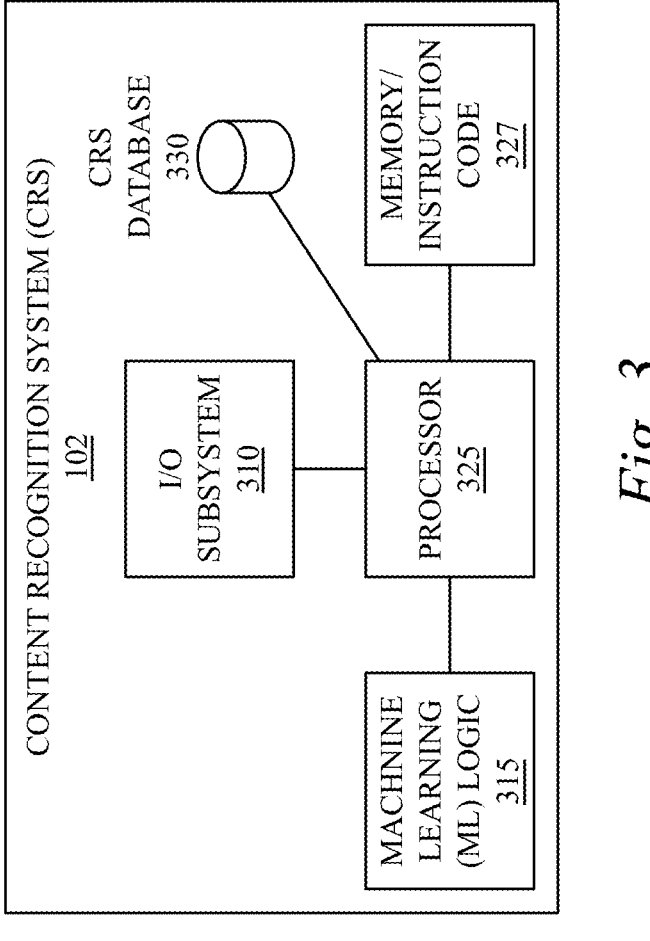
FIG. 3 illustrates a content recognition system (CRS), in accordance with an example.

FIG. 3 illustrates an example of a content recognition system (CRS) 102. An example of the CRS 102 includes a memory 327 and a processor 325. An example of CRS 102 also includes an input/output (I/O) subsystem 310, machine learning (ML) logic 315, and a CRS database 330.

An example of the processor 325 is in communication with the memory 327. The processor 325 is configured to execute instruction code stored in the memory 327. The instruction code facilitates performing, by the CRS 102, various operations that are described below. In this regard, the instruction code can cause the processor 325 to control and coordinate various activities performed by the different subsystems of the CRS 102. The processor 325 can correspond to a stand-alone computer system such as an Intel®, AMD®, or PowerPC® based computer system or a different computer system and can include application-specific computer systems. The computer system can include an operating system, such as Windows®, Linux, Unix®, or a different operating system.

An example of the I/O subsystem 310 includes one or more input/output interfaces configured to facilitate communications with entities outside of the CRS 102. An example of the I/O subsystem 310 is configured to communicate information via a RESTful API or a Web Service API. An example of I/O subsystem 310 implements a web browser to facilitate generating one or more web-based interfaces through which users of the CRS 102, the audio source device 104, and/or other systems interact with the CRS 102.

An example of the I/O subsystem 310 includes wireless communication circuitry configured to facilitate communicating information to and from the CRS 102. An example of the wireless communication circuitry includes cellular telephone communication circuitry configured to communicate information over a cellular telephone network such as a 3G, 4G, and/or 5G network. Other examples of the wireless communication circuitry facilitate communication of information via an 802.11 based network, Bluetooth®, Zigbee®, near field communication technology, or a different wireless network.

An example of the ML logic 315 is configured to, alone or in combination with other subsystems of the CRS 102, determine the cover song associated with HPCP information 110 communicated from the audio source device 104. Some examples of the ML logic 315 include hardware, software, or a combination thereof that is specifically configured to implement or assist in the implementation of various supervised and unsupervised machine learning models. Within examples, these can involve implementation of a Holt-Winters algorithm, exponential time smoothing (ETS) algorithm, an artificial neural network (ANN), a recurrent neural network (RNN), convolutional neural network (CNN), a seasonal autoregressive moving average (SARIMA) algorithm, a network of long short-term memories (LSTM), a gated recurring unit (GRU) algorithm.

An example of the ML logic 315 is configured to derive a bar_minor feature and a bar_major feature from the HPCP information 110 and then to input these features into further logic of the ML logic 315 to facilitate determining a particular embedding associated with these features. The bar_minor feature is associated with HPCP features specified in the HPCP information 110 that are aligned with the measures of a music track and that are correlated with minor chord profiles. The bar_major feature is associated with HPCP features specified in the HPCP information 110 that are aligned with the measures of a music track and that are correlated with major chord profiles.

In an example, these features are derived by first correlating the traditional HPCP features with known major and minor chord profiles. This involves performing major and minor scale groupings. In a particular example, performing the groupings comprises computing the dot product between the HPCP vector and a table that contains either major or minor chord triads. The resulting chord features are then time aligned to the nearest bar line (measure) based on the estimated tempo and beat of the music track. A normalized estimate of the twelve possible major and minor chords is finally created for the two features, respectively. This process facilitates deriving HPCP features that emphasize the sequential structure of the song with the major or minor chords that are present within the song.

In an example, each of these two HPCP-derived features (i.e., the bar_minor and the bar_major features) has dimensions of 12 (rows)×T (columns), where T is the number of time frames in the audio signal. In an example, the features are resampled to 256-time frames by linear interpolation on the time axis so that they are normalized across the durations for all works. In an example, each resampled feature is stacked three times vertically on the frequency axis to avoid wrap around when a melodic pattern goes beyond the displayed twelve root notes. In an example, the two post-processed features are combined in two channels and together have dimensions of 2 (channels)×36 (frequency bands)×256 (time frames).

Figure 4:
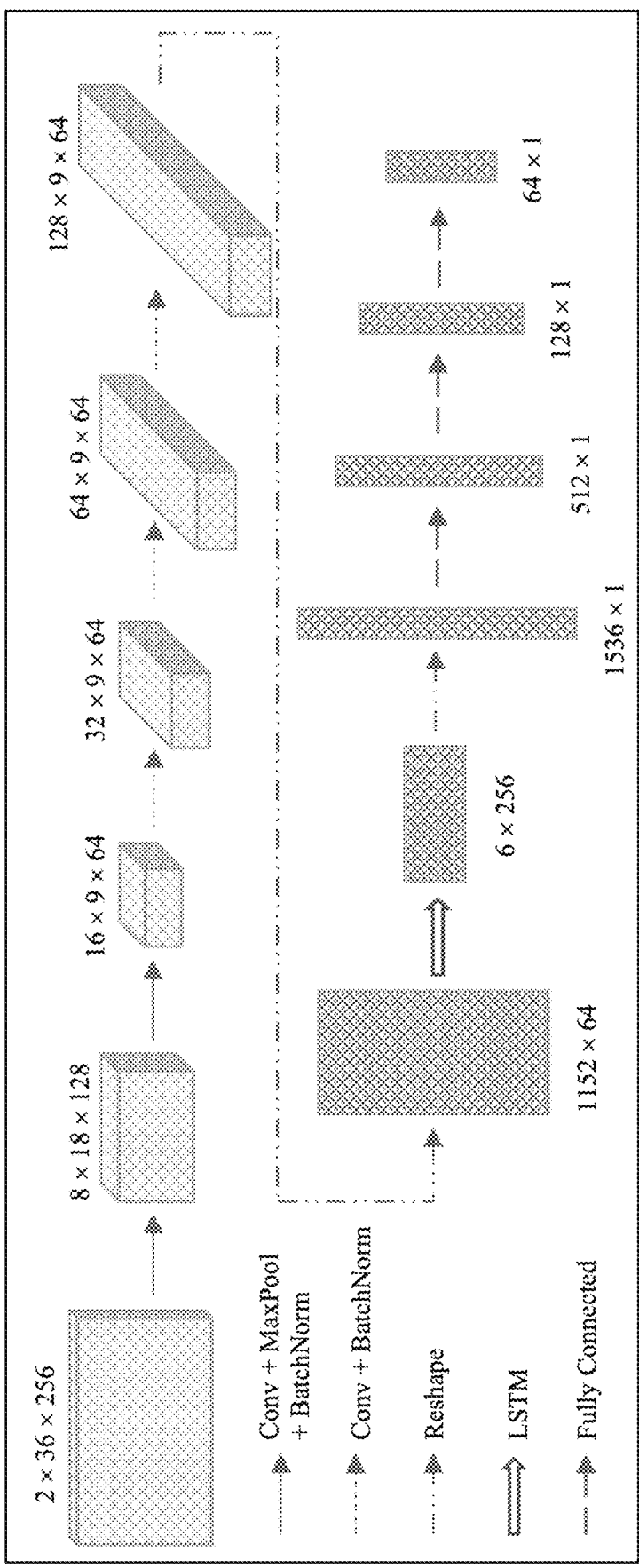
FIG. 4 illustrates machine learning (ML) logic implemented by the CRS, in accordance with an example.

FIG. 4 illustrates an example of ML logic 315 configured to determine an embedding 420 associated with the bar_major feature 402A and the bar_minor feature 402B described above. The ML logic 315 comprises a CNN module 405 having five convolutional blocks (405A-405D), followed by an RNN module 410 having three bidirectional LSTM blocks, followed by three fully connected layers (415A-415C). The convolutional blocks (405A-405D) of the CNN module 405, commonly used in computer vision, help to transform the audio features into key-invariant features, while the LSTM blocks of the RNN module 410, commonly used for time series data, aim at capturing the time information from the features.

The ML logic 315 is configured/trained to learn a characteristic vector of fixed length, or embedding 420, from a musical work. An example of the ML logic 315 is trained by using a Siamese framework with a contrastive loss function. Specifically, as described in more detail below, during training, the ML logic 315 takes a pair of works as input, either a positive pair if the works are covering the same song or a negative pair if they are from different songs, and learns two embeddings such that the Euclidean distance between two positive embeddings is small while the distance between two negative embeddings is large.

Each convolutional block (405A-405D) of the CNN module 405 comprises a 2-dimensional convolutional layer, a rectified linear unit (ReLU) activation function, a max-pooling layer, and a batch normalization layer. In an example, the max-pooling layer is only applied to the first two convolutional blocks (405A, 405B) of the CNN module 405 to maintain the temporal dimension. 3×3 kernels are utilized, and the number of such kernels in each of the five convolutional blocks (405A-405D) is 8, 16, 32, 64, and 128, respectively. A stride of one is utilized, and the temporal and the spatial dimensions are zero-padded. The CNN module 405 receives an input of dimensions 2×36×256, which corresponds to the input size of the bar_major feature 402A and bar_minor feature 402B. The CNN module 405 returns an output of dimension 128×9×64.

The output of the CNN module 405 is then reshaped into 1152×64 and fed into the RNN module 410. As noted above, the RNN module 410 comprises three blocks of bidirectional LSTM blocks. These blocks have a hidden size of 256. The outputs of each LSTM block of the RNN module 410 are concatenated, leading to an output of dimensions 6×256 for the RNN module 410. The output of the RNN module 410 is then reshaped into 1536×1 and fed into three fully connected layers (415A-415C) with 512, 128, and 64 nodes, respectively. The final output of the ML logic 315 is a vector of length 64, which corresponds to the embedding 420.

As noted above, the ML logic 315 is trained to learn a characteristic vector of fixed length, or embedding, from a musical work. And as noted above, in an example, the ML logic 315 is trained using a Siamese framework with a contrastive loss function. An example of the contrastive loss function is expressed as follows:

$$L\left(x_i^{(1)}, x_i^{(2)}, y_i\right) =$$
$$\frac{1}{2}y_i\left\|f\left(x_i^{(1)}\right) - f\left(x_i^{(2)}\right)\right\|^2 + \frac{1}{2}(1 - y_i)\left[\max\left(0, m - \left\|f\left(x_i^{(1)}\right) - f\left(x_i^{(2)}\right)\right\|\right)\right]^2$$

where $$x_i^{(1)}, x_i^{(2)}, y_i$$

defines the $i^{th}$ triplet data, $$x_i^{(1)} \text{ and } x_i^{(2)}$$

represent the feature inputs of two musical works, $y_i$ indicates if the two works are covering the same song or not, f is the embedding function of the proposed system, $\|\cdot\|$ is the Euclidean distance, and m is a margin hyperparameter.

As can be seen, when the loss for the triplet i is minimized, the Euclidean distance between the embeddings of two works covering the same song is also minimized, while their distance is maximized by a margin of m if they are from different songs. A linear regularization with a parameter of 0.3 is added to the total loss to prevent overfitting.

In an example training process, a batch size of 100 is used (i.e., 100 different pairs of works) and applied to an online negative hard pair selector within each batch. To compute the total loss within a batch, the loss obtained for all 100 positive pairs is accumulated, but this loss only accounts for the loss of the 100 negative pairs that give the largest loss values.

In an example, an Adam optimizer is used, and a margin m=20 is chosen. A value of 0.001 is used as the initial learning rate, and the value is halved every 50 epochs. The training process is run for 300 epochs. The hyper-parameters, including the margin, the regularization parameter, and the learning rate, are all determined by a grid search. During the training process, the model that returns the largest AUC (i.e., area under the receiver operating characteristic curve) for the validation set is stored.

FIG. 5 illustrates an example of content matching records 500 stored in the CRS database 330. In an example, the content matching records 500 include a content ID field, a content information field, and an embeddings field. An example of a content ID field specifies information (e.g., a randomly assigned value, a hash of content data) that uniquely identifies particular content (e.g., a particular song). An example of the content information field specifies a particular song, artist, album, etc. An example of the embeddings field specifies an embedding associated with a particular work of music. Examples of the embedding are generated for a plethora of musical recordings according to the techniques described above.

FIG. 6 illustrates examples of operations performed by entities of the environment of FIG. 1, such as the audio source device 104 and the CRS 102. In this regard, one or more of the operations can be implemented via instruction code, stored in respective memories of the audio source device 104 and the CRS 102 configured to cause the processors of the audio source device 104 and the CRS 102 to perform the operations illustrated in the figures and discussed herein.

At block 600, the CRS 102 receives harmonic pitch class profile (HPCP) information 110 that specifies HPCP features associated with target audio content from the audio source device 104. As noted above, an example of the HPCP extractor 215 of the audio source device 104 is configured to input audio samples associated with audio content and is configured to perform various operations to derive HPCP features from the target audio content.

At block 605, the CRS 102 derives a major chord profile feature 402A and a minor chord profile feature 402B from the HPCP features received above. For example, the CRS 102 correlates HPCP features with known major and minor chord profiles. The resulting chord features are time-aligned to the nearest bar line (measure) based on the estimated tempo and beat of the music track. A normalized estimate of the 12 possible major and minor chords is created for the two features, respectively. The features are resampled to 256-time frames by linear interpolation on the time axis so that they are normalized across the durations for all works and stacked three times vertically on the frequency axis to avoid wrap around when a melodic pattern goes beyond the displayed twelve root notes. The major chord profile feature 402A and the minor chord profile feature 402B are combined in two channels that together have dimensions of 2 (channels)×36 (frequency bands)×256 (time frames).

At block 610, the CRS 102 determines a target embedding 420 associated with the major chord profile feature 402A and the minor chord profile feature 402B determined above. As noted above, an example of the ML logic 315 of the CRS 102 comprises a CNN module 405 having five convolutional blocks (405A-405E), followed by an RNN module 410 with three bidirectional LSTM blocks, followed by three fully connected layers (415A-415C). The input layer of the CNN module 405 is configured to receive the major chord profile feature 402A and the minor chord profile feature 402B. The output of the RNN module 410 is then reshaped into 1536×1 and fed into three fully connected layers (415A-415C) with 512, 128, and 64 nodes, respectively. The final output of the ML logic 315 is a vector of length 64, which corresponds to the embedding 420.

At block 615, the CRS 102 locates a database record 500 specifying an embedding 420 that is closest to a target embedding 420. For example, the CRS 102 determines the relatedness between the target embedding 420 and the embedding specified in each of the content matching records 500. The degree of relatedness is determined according to the Euclidean distance between the target embedding 420 and the embeddings specified in the content matching records 500. The embedding in the content matching records 500 that is determined to have the smallest Euclidean distance from the target embedding 420 is determined to be the most related embedding. In an example, the cover song associated with a particular embedding is determined to be the cover song associated with the target embedding 420 when the Euclidean distance between the embedding associated with the cover song and the target embedding 420 is below a pre-determined threshold.

At block 620, the CRS 102 communicates the cover song information determined above to the audio source device 104.

FIG. 7 illustrates an example of a method that can be performed by one or more systems or devices described herein. Block 700 involves receiving, by a computing system 102 and from a user device 104, harmonic pitch class profile (HPCP) information associated with one or more HPCP features associated with target audio content.

Block 705 involves deriving, from the one or more HPCP features, a major chord profile feature 402A and a minor chord profile feature 402B associated with the target audio content.

Block 710 involves determining, by machine learning logic 315 of the computing system 102 and based on the major chord profile feature 402A and the minor chord profile feature 402B, a relatedness between the target audio content and each of a plurality of audio content items specified in records 500 of a database, wherein each audio content item is associated with cover song information; and Block 715 involves communicating, to the user device, content information 112 that specifies cover song information associated with an audio content item having a highest relatedness to the target audio content.

In an example, determining the relatedness between the target audio content and each of the plurality of audio content items specified in records of a database further involves determining, by the machine learning logic, a target embedding associated with the major chord profile feature and the minor chord profile feature associated with the target audio content.

In an example, determining the relatedness between the target audio content and each of a plurality of audio content items further involves determining a Euclidean distance between the target embedding, and embeddings specified in the records that are associated with respective audio content items, wherein a relatedness between the target audio content and the audio content items increases as the distance decreases.

In an example, determining the target embedding involves inputting the major chord profile feature and the minor chord profile feature associated with the target audio content into a convolutional neural network (CNN) of the ML logic, receiving, by a recurrent neural network (RNN) of the ML logic, an output of the CNN, and reshaping an output of the RNN to a vector that corresponds to the target embedding.

In an example, deriving the major chord profile feature and the minor chord profile feature associated with the target audio content further involves selecting HPCP features that correlate with twelve different major chords and twelve different minor chords.

An example involves time aligning selected HPCP features to a nearest bar line or measure based on an estimated tempo and beat associated with the target audio content.

An example involves normalizing the time-aligned selected HPCP features, resampling the normalized selected HPCP features to 256 frames, and stacking the resampled HPCP features three times vertically, so that both the major chord profile feature and the minor chord profile feature have dimensions of 36 rows×256 columns.

An example involves training the machine learning logic to determine the relatedness between the target audio content and each of a plurality of audio content items specified in records of a database with a Siamese framework having a contrastive loss function. An example of the contrastive loss function is expressed as:

$$L\!\left(x_i^{(1)}, x_i^{(2)}, y_i\right) =$$

$$\frac{1}{2}y_i\left\|f\!\left(x_i^{(1)}\right) - f\!\left(x_i^{(2)}\right)\right\|^2 + \frac{1}{2}(1 - y_i)\left[\max\!\left(0, m - \left\|f\!\left(x_i^{(1)}\right) - f\!\left(x_i^{(2)}\right)\right\|\right)\right]^2$$

where $$x_i^{(1)}, x_i^{(2)}, y_i$$

defines the $i^{th}$ triplet data, $$x_i^{(1)} \text{ and } x_i^{(2)}$$

represent the feature inputs of two musical works, $y_i$ indicates whether the two musical works are covering the same song, f is the embedding function of the proposed system, $\|\cdot\|$ is the Euclidean distance, and m is a margin hyperparameter.

Figure 8:
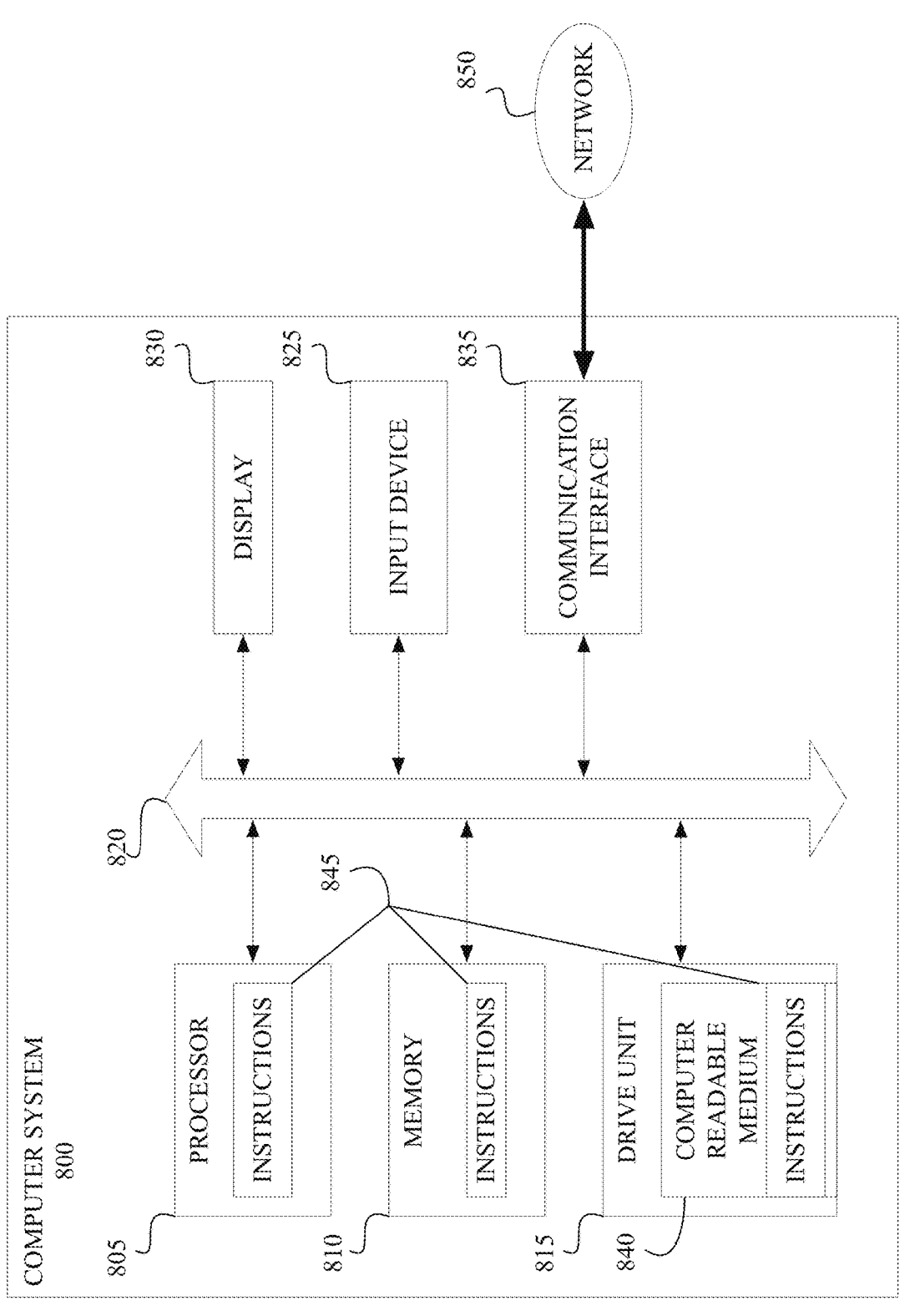
FIG. 8 illustrates a computer system that can form part of or implement any of the systems or devices of the environment, in accordance with an example.

FIG. 8 illustrates an example of a computer system 800 that can form part of or implement any of the systems and/or devices described above. The computer system 800 can include a set of instructions 845 that the processor 805 can execute to cause the computer system 800 to perform any of the operations described above. An example of the computer system 800 can operate as a stand-alone device or can be connected, e.g., using a network, to other computer systems or peripheral devices.

In a networked example, the computer system 800 can operate in the capacity of a server or as a client computer in a server-client network environment, or as a peer computer system in a peer-to-peer (or distributed) environment. The computer system 800 can also be implemented as or incorporated into various devices, such as a personal computer or a mobile device, capable of executing instructions 845 (sequential or otherwise), causing a device to perform one or more actions. Further, each of the systems described can include a collection of subsystems that individually or jointly execute a set, or multiple sets, of instructions to perform one or more computer operations.

The computer system 800 can include one or more memory devices 810 communicatively coupled to a bus 820 for communicating information. In addition, code operable to cause the computer system to perform operations described above can be stored in the memory 810. The memory 810 can be random-access memory, read-only memory, programmable memory, hard disk drive, or any other type of memory or storage device.

The computer system 800 can include a display 830, such as a liquid crystal display (LCD), a cathode ray tube (CRT), or any other display suitable for conveying information. The display 830 can act as an interface for the user to see processing results produced by processor 805.

Additionally, the computer system 800 can include an input device 825, such as a keyboard or mouse or touch-screen, configured to allow a user to interact with components of system 800.

The computer system 800 can also include a disk or optical drive unit 815. The drive unit 815 can include a computer-readable medium 840 in which the instructions

845 can be stored. The instructions 845 can reside completely, or at least partially, within the memory 810 and/or within the processor 805 during execution by the computer system 800. The memory 810 and the processor 805 also can include computer-readable media, as discussed above.

The computer system 800 can include a communication interface 835 to support communications via a network 850. The network 850 can include wired networks, wireless networks, or combinations thereof. The communication interface 835 can enable communications via any number of wireless broadband communication standards, such as the Institute of Electrical and Electronics Engineering (IEEE) standards 802.11, 802.12, 802.16 (WiMAX), 802.20, cellular telephone standards, or other communication standards.

Accordingly, methods and systems described herein can be realized in hardware, software, or a combination of hardware and software. The methods and systems can be realized in a centralized fashion in at least one computer system or in a distributed fashion where different elements are spread across interconnected computer systems. Any kind of computer system or other apparatus adapted for carrying out the methods described herein can be employed.

The methods and systems described herein can also be embedded in a computer program product, which includes all the features enabling the implementation of the operations described herein and which, when loaded in a computer system, can carry out these operations. Computer program as used herein refers to an expression, in a machine-executable language, code or notation, of a set of machine-executable instructions intended to cause a device to perform a particular function, either directly or after one or more of a) conversion of a first language, code, or notation to another language, code, or notation; and b) reproduction of a first language, code, or notation.

While the systems and methods of operation have been described with reference to certain examples, it will be understood by those skilled in the art that various changes can be made and equivalents can be substituted without departing from the scope of the claims. Therefore, it is intended that the present methods and systems not be limited to the particular examples disclosed, but that the disclosed methods and systems include all embodiments falling within the scope of the appended claims.

What is claimed is:

1. A tangible, non-transitory computer-readable storage medium comprising instructions that, when executed by one or more processors, cause a computing device to perform a set of operations comprising:

deriving, from one or more harmonic pitch class profile (HPCP) features associated with target audio content, a major chord profile feature and a minor chord profile feature associated with the target audio content, wherein deriving the major chord profile feature and the minor chord profile feature associated with the target audio content comprises selecting HPCP features that correlate with twelve different major chords and twelve different minor chords, time aligning the selected HPCP features to a nearest bar line or measure based on an estimated tempo and beat associated with the target audio content, and normalizing the time aligned selected HPCP features, to emphasize a sequential structure of the target audio content with major and minor chords that are present in the target audio content; and determining, by machine learning logic, based on at least the major chord profile feature and the minor chord profile feature, a relatedness between the target audio content and at least one audio content item of a database, wherein the at least one content item is associated with cover song information.

2. The tangible, non-transitory computer-readable storage medium of claim 1, wherein the set of operations further comprises communicating cover song information associated with the at least one audio content item based on a relatedness to the target audio content.

3. The tangible, non-transitory computer-readable storage medium of claim 1, wherein the at least one audio content items comprises a plurality of audio content items.

4. The tangible, non-transitory computer-readable storage medium of claim 3, wherein determining a relatedness between the target audio content and at least one audio content item of a database comprises determining a relatedness between the target audio content and each of the plurality of audio content items of the database.

5. The tangible, non-transitory computer-readable storage medium of claim 4, wherein the set of operations further comprises communicating cover song information associated with an audio content item of the plurality of audio content items having a highest relatedness to the target audio content.

6. The tangible, non-transitory computer-readable medium of claim 1, wherein determining the relatedness between the target audio content and at least one audio content item a database further comprises:

determining, by the machine learning logic, a target embedding associated with the major chord profile feature and the minor chord profile feature associated with the target audio content.

7. The tangible, non-transitory computer-readable medium of claim 6, wherein determining the target embedding comprises:

inputting the major chord profile feature and the minor chord profile feature associated with the target audio content into a convolutional neural network (CNN) of the machine learning logic;

receiving, by a recurrent neural network (RNN) of the machine learning logic, an output of the CNN; and reshaping an output of the RNN to a vector that corresponds to the target embedding.

8. A computing device that facilitates cover song identification comprising:

one or more processors; and a tangible, non-transitory computer-readable storage medium comprising instructions that, when executed by the one or more processors, cause the computing device to perform a set of operations comprising:

deriving, from one or more harmonic pitch class profile (HPCP) features associated with target audio content, a major chord profile feature and a minor chord profile feature associated with the target audio content, wherein deriving the major chord profile feature and the minor chord profile feature associated with the target audio content comprises selecting HPCP features that correlate with twelve different major chords and twelve different minor chords, time aligning the selected HPCP features to a nearest bar line or measure based on an estimated tempo and beat associated with the target audio content, and normalizing the time aligned selected HPCP features, to emphasize a sequential structure of the target audio content with major and minor chords that are present in the target audio content; and determining, by machine learning logic, based on at least the major chord profile feature and the minor chord profile feature, a relatedness between the target audio content and at least one audio content item of a database, wherein the at least one content item is associated with cover song information.

9. The computing device of claim 8, wherein the set of operations further comprises communicating cover song information associated with the at least one audio content item based on a relatedness to the target audio content.

10. The computing device of claim 8, wherein the at least one audio content items comprises a plurality of audio content items.

11. The computing device of claim 10, wherein determining a relatedness between the target audio content and at least one audio content item of a database comprises determining a relatedness between the target audio content and each of the plurality of audio content items of the database.

12. The computing device of claim 11, wherein the set of operations further comprises communicating cover song information associated with an audio content item of the plurality of audio content items having a highest relatedness to the target audio content.

13. The computing device of claim 8, wherein determining the relatedness between the target audio content and at least one audio content item a database further comprises:

determining, by the machine learning logic, a target embedding associated with the major chord profile feature and the minor chord profile feature associated with the target audio content.

14. The computing device of claim 13, wherein determining the target embedding comprises:

inputting the major chord profile feature and the minor chord profile feature associated with the target audio content into a convolutional neural network (CNN) of the machine learning logic;

receiving, by a recurrent neural network (RNN) of the machine learning logic, an output of the CNN; and reshaping an output of the RNN to a vector that corresponds to the target embedding.

15. A computer-implemented method comprising:

deriving, from one or more harmonic pitch class profile (HPCP) features associated with target audio content, a major chord profile feature and a minor chord profile feature associated with the target audio content, wherein deriving the major chord profile feature and the minor chord profile feature associated with the target audio content comprises selecting HPCP features that correlate with twelve different major chords and twelve different minor chords, time aligning the selected HPCP features to a nearest bar line or measure based on an estimated tempo and beat associated with the target audio content, and normalizing the time aligned selected HPCP features, to emphasize a sequential structure of the target audio content with major and minor chords that are present in the target audio content; and determining, by machine learning logic, based on at least the major chord profile feature and the minor chord profile feature, a relatedness between the target audio content and at least one audio content item of a database, wherein the at least one content item is associated with cover song information.

16. The computer-implemented method of claim 15, wherein the method further comprises communicating cover song information associated with the at least one audio content item based on a relatedness to the target audio content.

17. The computer-implemented method of claim 15, wherein the at least one audio content items comprises a plurality of audio content items.

18. The computer-implemented method of claim 17, wherein determining a relatedness between the target audio content and at least one audio content item of a database comprises determining a relatedness between the target audio content and each of the plurality of audio content items of the database.

19. The computer-implemented method of claim 18, wherein the method further comprises communicating cover song information associated with an audio content item of the plurality of audio content items having a highest relatedness to the target audio content.

20. The computer-implemented method of claim 15, wherein determining the relatedness between the target audio content and at least one audio content item a database further comprises:

determining, by the machine learning logic, a target embedding associated with the major chord profile feature and the minor chord profile feature associated with the target audio content.

* * * * *